United States Patent
Matsutani

(10) Patent No.: US 7,929,318 B2
(45) Date of Patent: Apr. 19, 2011

(54) POWER SWITCH ATTACHMENT STRUCTURE OF THIN DISPLAY DEVICE

(75) Inventor: Nobuhiro Matsutani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 719 days.

(21) Appl. No.: 11/984,499

(22) Filed: Nov. 19, 2007

(65) Prior Publication Data

US 2008/0116045 A1 May 22, 2008

(30) Foreign Application Priority Data

Nov. 22, 2006 (JP) ................................. 2006-315092

(51) Int. Cl.
*H05K 7/14* (2006.01)

(52) U.S. Cl. ........ 361/802; 361/683; 361/686; 361/807; 361/809; 200/448; 200/303; 200/314; 439/154; 439/342

(58) Field of Classification Search .................. 361/802, 361/679, 681, 686, 760, 679.21, 679.26, 361/679.3, 679.33; 200/448, 303, 314; 439/154, 439/342

See application file for complete search history.

(56) References Cited

U.S. PATENT DOCUMENTS

| | | | | | |
|---|---|---|---|---|---|
| 4,291,201 | A | * | 9/1981 | Johnson et al. | 379/368 |
| 4,354,077 | A | * | 10/1982 | McMains et al. | 200/314 |
| 4,614,846 | A | * | 9/1986 | Guercio et al. | 200/5 E |
| 5,550,342 | A | * | 8/1996 | Danek et al. | 200/448 |
| 6,144,368 | A | * | 11/2000 | Ooka et al. | 345/161 |
| 6,265,984 | B1 | * | 7/2001 | Molinaroli | 340/815.4 |
| 6,344,622 | B1 | * | 2/2002 | Takiguchi et al. | 200/314 |
| 6,788,532 | B2 | * | 9/2004 | Yang et al. | 361/679.33 |
| 6,795,097 | B1 | * | 9/2004 | Yamaguchi et al. | 715/810 |
| 2003/0076315 | A1 | | 4/2003 | Yu | 345/211 |
| 2004/0042168 | A1 | * | 3/2004 | Yang et al. | 361/685 |
| 2006/0244721 | A1 | | 11/2006 | Wang et al. | 345/156 |
| 2006/0250762 | A1 | * | 11/2006 | Yang et al. | 361/681 |
| 2007/0040674 | A1 | * | 2/2007 | Hsu | 340/539.31 |
| 2007/0288193 | A1 | * | 12/2007 | Lima | 702/136 |

FOREIGN PATENT DOCUMENTS

| | | |
|---|---|---|
| EP | 1 197 979 A1 | 4/2002 |
| JP | 2000-299567 | 10/2000 |
| JP | 2001-076566 | 3/2001 |
| JP | 2005-347989 | 12/2005 |

* cited by examiner

*Primary Examiner* — Xiaoliang Chen

(74) *Attorney, Agent, or Firm* — Morgan, Lewis & Bockius LLP

(57) ABSTRACT

A switch body is mounted on a sub-board, the sub-board is held, by fastening it with screws together with a protective plate that protects a surface of the sub-board on the opposite side of a mounting surface of the sub-board, in a holding wall formed integrally with a jack holder such that the mounting surface of the sub-board is disposed facing a mounting surface of a main board, and an operation portion of a push button is allowed to project to the outside of a casing from a square hole disposed in the jack holder.

7 Claims, 5 Drawing Sheets

POWER SWITCH ATTACHMENT STRUCTURE OF THIN DISPLAY DEVICE

CROSS-REFERENCE TO RELATED APPLICATION

This application is based on Japanese Patent Application No. 2006-315092 filed on Nov. 22, 2006, and the contents thereof are incorporated by reference herein.

BACKGROUND OF THE INVENTION

1. Field of the Invention

The present invention relates to a power switch attachment structure of a thin display device such as a liquid crystal television receiver, a plasma television receiver, and a liquid crystal monitor.

2. Description of Related Art

In thin display devices such as liquid crystal television receivers, plasma television receivers, and liquid crystal monitors, it is common for a main board to be disposed in an orientation upright in a vertical direction on the back of a liquid crystal display module because it is difficult to ensure space for disposing parts in a depth direction inside a casing, such as in a conventional CRT display device.

In the case of thin display devices that are 32 inches or greater in size and which often employ an aspect ratio of 16:9, a main board with a wide mounting area can be installed, so it is possible to mount a power switch on the main board, and product models disposed with a power switch are common.

However, in the case of compact thin display devices that are 20 inches or less in size and which often employ an aspect ratio of 4:3, the mounting area of the main board is not wide, so product models that do not have a power switch are common.

In JP-A No. 2001-76566, there is described disposing, on the rear surface portion of a casing of a video game device, a switch/inlet unit that is unitized by housing a power switch and an input terminal (inlet) of an AC power source inside a case, but this is not something that relates to a power switch of a thin display device.

Further, in JP-A No. 2005-347989, there is described disposing a rod-like member that interconnects a power switch and a power button on the underside of a main board disposed in a horizontal direction inside a casing of a CRT television receiver, but this is not technology that overcomes the aforementioned problem of being unable to mount the power switch on the main board because the power switch is mounted on the main board.

SUMMARY OF THE INVENTION

The present invention has been made in view of the aforementioned conventional problem, and it is an object thereof to provide a power switch attachment structure of a thin display device where, even when the power switch cannot be mounted on the main board, the power switch can be disposed in an economized space without increasing the depth of the casing.

In order to achieve this object, a power switch attachment structure of a thin display device pertaining to a first aspect of the invention comprises: a display module; a main board that is disposed on the back of the display module such that a surface of the main board on the opposite side of a surface on which parts are mounted faces the display module; a push type power switch that includes a switch body and a shaft disposed such that it may freely advance from and retract into the shaft body; a push button that is attached to the shaft and pushed when switching power ON and OFF; and a plate member that is attached to one end edge of the main board and is disposed on a casing side surface portion, wherein the power switch is held in a holding portion formed integrally with the plate member such that the power switch faces a mounting surface of the main board, and an operation portion of the push button is allowed to project to the outside of the casing from an open portion disposed in the plate member.

According to this configuration, even when the power switch cannot be mounted on the main board, the power switch is held in the holding portion formed integrally on the plate member disposed on the casing side surface portion such that the power switch faces the mounting surface of the main board, whereby the power switch can be disposed in an economized space without increasing the depth of the casing.

Further, a power switch attachment structure of a thin display device pertaining to a second aspect of the invention comprises the power switch attachment structure of a thin display device pertaining to the first aspect of the invention, wherein the switch body is mounted on a sub-board and the sub-board is held in the holding portion such that a mounting surface of the sub-board is disposed facing the mounting surface of the main board.

According to this configuration, the work of attaching the power switch can be performed easily because the power switch can be easily held in the holding portion of the plate member using the sub-board to which a switch body has been soldered and a power cord has been connected beforehand. In this case, the power switch can be disposed in an economized space without increasing the depth of the casing because the mounting surface of the sub-board is disposed so as to face the mounting surface of the main board.

Further, a power switch attachment structure of a thin display device pertaining to a third aspect of the invention comprises the power switch attachment stricture of a thin display device pertaining to the second aspect of the invention, wherein a protective plate that protects the surface of the sub-board on the opposite side of the mounting surface of the sub-board is disposed.

According to this configuration, the work of assembling the casing can be performed safely because attachment legs and solder of the switch body exposed to the surface on the side of the sub-board opposite from the mounting surface are covered by the protective plate.

Further, a power switch attachment structure of a thin display device pertaining to a fourth aspect of the invention comprises the power switch attachment stricture of a thin display device pertaining to the third aspect of the invention, wherein the protective plate and the sub-board are held in the holding portion of the plate member by fastening them together with screws.

According to this configuration, costs can be reduced and productivity can be improved because the sub-board and the protective plate are held in the holding portion of the plate member by fastening them together with screws.

Further, a power switch attachment structure of a thin display device pertaining to fifth to eighth aspects of the invention comprises the power switch attachment structure of a thin display device pertaining to the first to fourth aspects of the invention, wherein the plate member is a jack holder that holds various kinds of jacks such as a video input terminal, an audio input terminal, and an antenna terminal.

According to this configuration, a thin display device having a power switch installed therein can be inexpensively realized just by forming the holding portion that holds the power switch in the jack holder that is a small part without having to change the specifications of the casing or main board.

DETAILED DESCRIPTION OF THE PREFERRED EMBODIMENT

Figure 1:
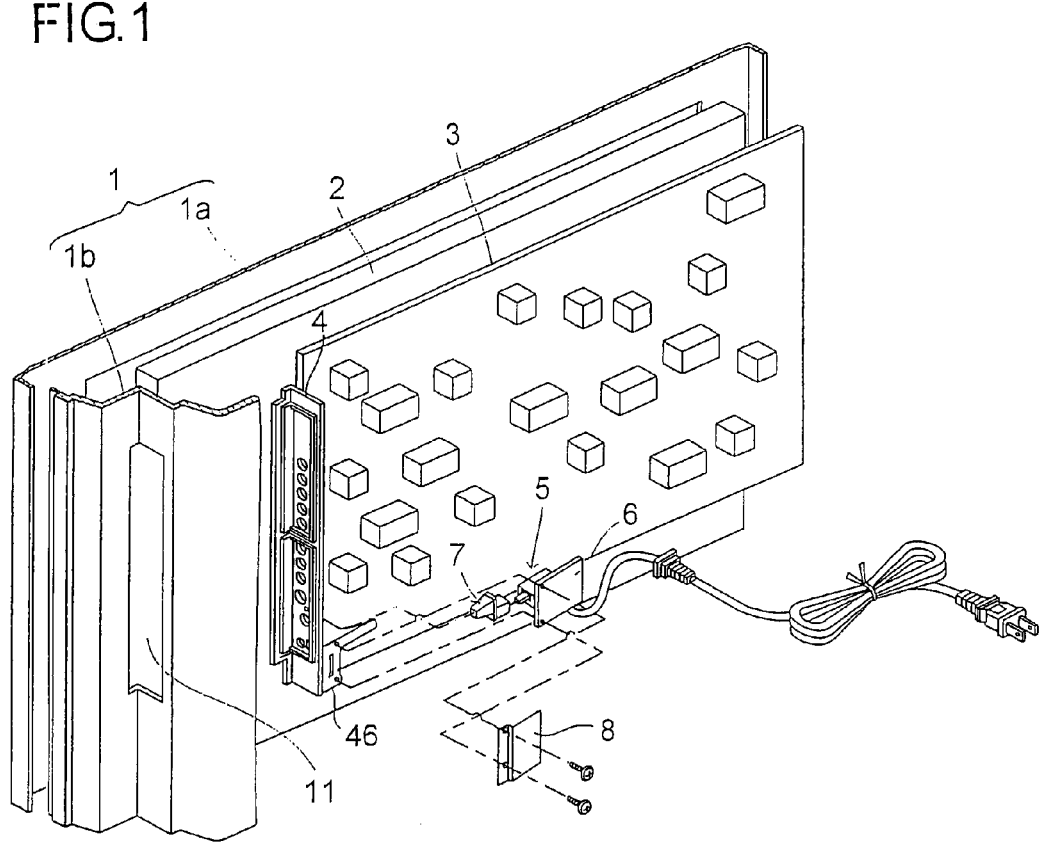
FIG. 1 is an abbreviated exploded perspective view of main configural portions showing a rear cover of a casing of a liquid crystal television receiver pertaining to an embodiment of the present invention.

The best mode for implementing the present invention will be described below with reference to the drawings taking as an example a liquid crystal television receiver that is an example of a thin display device. FIG. 1 is an exploded perspective view of main configural elements showing part of a casing of the liquid crystal television receiver pertaining to the embodiment of the present invention, and FIG. 2 is an abbreviated horizontal sectional view showing part of the same liquid crystal television receiver.

As shown in FIG. 1, the liquid crystal television receiver includes a casing 1, a liquid crystal display module 2, and a main board 3. The casing 1 includes a front cover 1a made of resin and a rear cover 1b made of resin. The liquid crystal display module 2 includes a liquid crystal display panel and a backlight device and is unitized. The liquid crystal display module 2 and the main board 3 are fixed with screws or the like to the front cover 1a, necessary electrical parts and mechanical parts are thereafter attached, and the rear cover 1b is attached to the front cover 1a, whereby the casing 1 is assembled.

Figure 2:
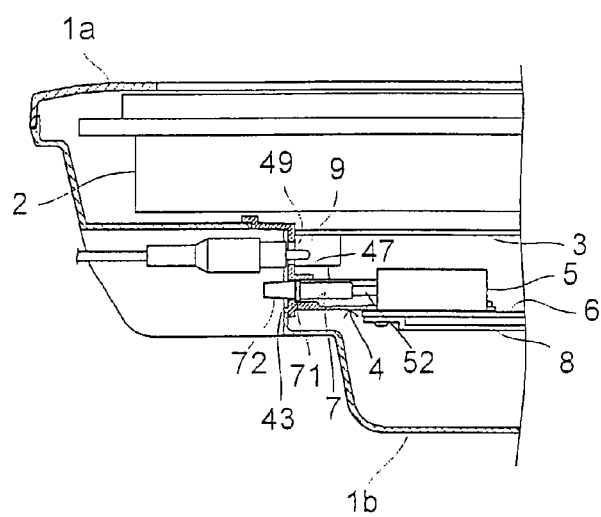
FIG. 2 is an abbreviated horizontal sectional view showing part of the same liquid crystal television receiver.

As shown in FIG. 2, the liquid crystal display module 2 is disposed on the front cover 1a such that the display surface of the liquid crystal display panel of the liquid crystal display module 2 faces an opening in the front of the front cover 1a, and the liquid crystal display module 2 is fixed to the front cover 1a with screws or the like. Necessary electronic parts excluding a power switch 5 are already mounted on the main board 3, and the main board 3 is disposed on the back of the liquid crystal display module 2 such that the surface of the main board 3 on the opposite side of the surface on which parts are mounted faces the liquid crystal display module 2.

Here, normally the power switch 5 should be mounted on the main board 3 because the power switch 5 is an electronic part, but as mentioned above, in the case of compact thin display devices whose size is 20 inches or less, it becomes necessary to separately ensure space inside the casing 1 for disposing the power switch 5 because the mounting area of the main board 3 cannot be made wide.

However, because of the desire of users for thinness, inside the casing 1 to which the rear cover 1b is attached there is virtually no space on the rear side of the portion of the main board 3 on which parts are mounted. Nonetheless, looking across the entire mounting surface of the main board 3, what are mainly mounted thereon are conductor lines of circuits, and places exist where only parts that are not as bulky as condensers are mounted. It is relatively easy to ensure space on the rear side of such places. In the present embodiment, an attachment structure for disposing the power switch 5 in an economized space via a jack holder 4 effectively utilizing the space that arises on the rear side of the lower left corner of the mounting surface of the main board 3 will be described.

First, the jack holder 4 will be described. The jack holder 4 is a member that holds various kinds of jacks 9 (see FIG. 2), such as a video input terminal and an audio input terminal for connection to external devices and an antenna terminal for connection to an antenna. As shown in FIG. 1, the jack holder 4 is a long and narrow member that is made of resin and disposed in an open portion 11 in a side surface portion of the casing 1. The jack holder 4 is fixed with screws or the like to one end edge of the mounting surface of the main board 3 via screw-use projecting pieces 48 (see FIG. 4) that are plurally formed at intervals vertically on the rear side of a base portion 41.

Figure 3:
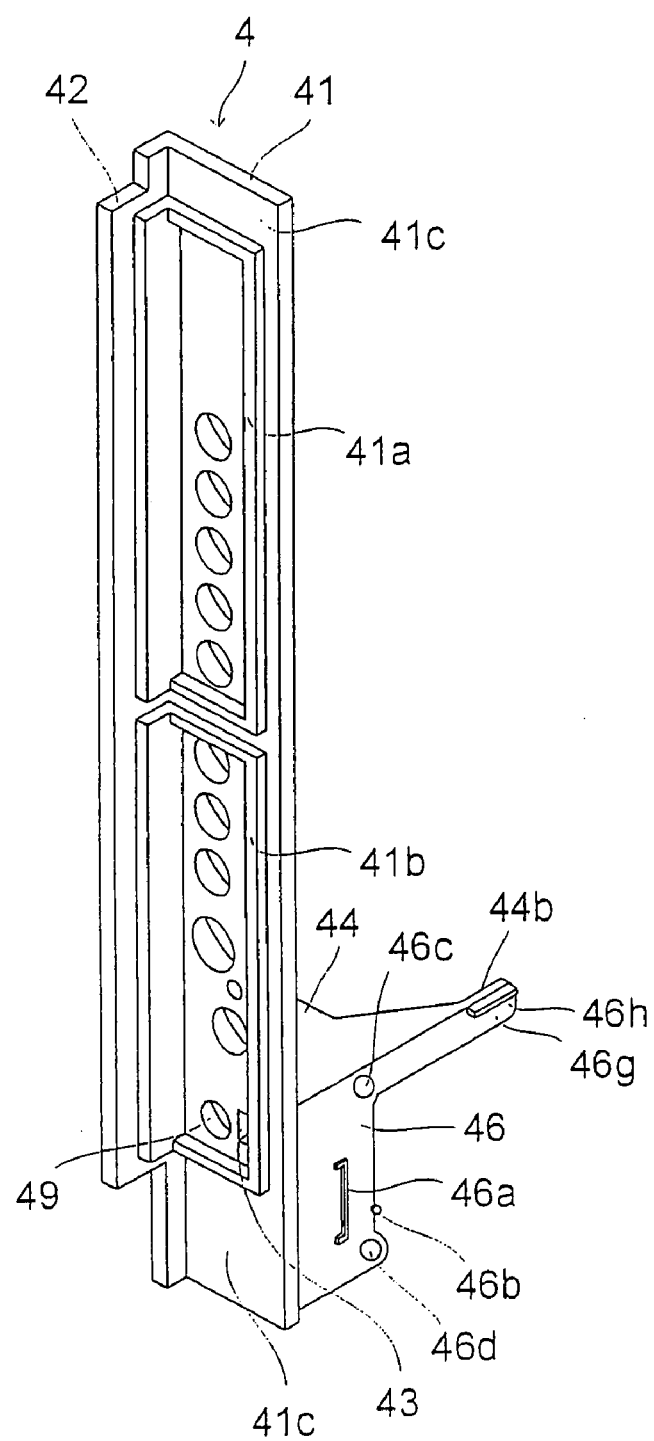
FIG. 3 is a perspective view where a jack holder is seen from its front side.

FIG. 3 is a perspective view where the jack holder 4 is seen from its front side. As shown in FIG. 3, the jack holder 4 is a member that is substantially L-shaped, made of a hard resin, integrally molded, and includes a base portion 41 and a flange portion 42. The base portion 41 is disposed with plural round holes and square holes for attaching the jacks. The flange portion 42 is integrally formed so as to project at a right angle from one long edge portion of the base portion 41.

On the base portion 41, a pair of enclosure ribs 41a and 41b for fitting together with the open portion 11 (see FIG. 1) in the side surface of the casing 1 and positioning the jack holder 4 are vertically disposed, and contact portions 41c for contacting the rear side of the periphery of the open portion 11 in the side surface of the casing 1 and positioning the jack holder 4 are formed to the periphery of the enclosure ribs 41a and 41b. One of the rib walls of each of the enclosure ribs 41a and 41b is formed in a trapezoidal shape on the flange portion 42, and the height of that wall is formed higher than that of the other rib walls in correspondence thereto. By forming one of the rib walls of each of the enclosure ribs 41a and 41b in a trapezoidal shape on the flange portion 42 in this manner, it becomes possible to precisely position the jack holder 4 in the open portion 11 formed in the corner edge portion of the side surface of the casing 1.

A square hole 43 for allowing an operation portion 72 of a push button 7 attached to a shaft 52 of the power switch 5 shown in FIG. 2 to project to the outside of the jack holder 4—that is, the outside of the casing 1—is disposed in a lower portion of the base portion 41 of the jack holder 4 inside the enclosure rib 41b and next to a round hole 49 for fixing a specific jack.

Figure 8:
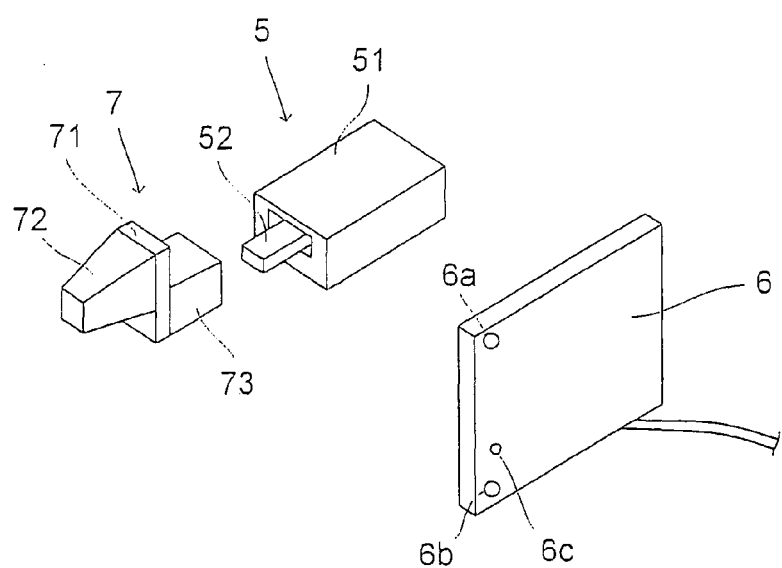
FIG. 8 is an exploded perspective view showing a power switch, a push button and a sub-board.

Here, the power switch 5, the push button 7 and a sub-board 6 will be described first. FIG. 8 is an exploded perspective view showing the power switch 5, the push button 7 and the sub-board 6.

As shown in FIG. 8, the power switch 5 is a push type power switch that includes a switch body 51 and the shaft 52. The shaft 52 is disposed such that it may freely advance from and retract into the switch body 51 and has a square rod shape in whose periphery a groove is formed. The switch body 51 is mounted on the small-sized sub-board 6. Because attachment legs of the switch body 51 and solder are exposed on the surface on the opposite side of the mounting surface of the sub-board 6, as shown in FIG. 1, a protective plate 8 that covers this surface of the sub-board 6 is separately disposed.

As shown in FIG. 8, the push button 7 includes a rectangular plate-shaped base portion 71, the operation portion 72 that is formed integrally on the upper end portion of one side of the base portion 71 and has a square pyramid truncated shape, and a cap portion 73 that is a square cylinder formed integrally on the lower end portion of the other side of the base portion 71. The push button 7 is attached to the power switch 5 by fitting the shaft 52 of the power switch 5 together with the cap portion 73, with the operation portion 72 facing up and the cap portion 73 facing down.

As shown in FIG. 2, the sub-board 6 is fixed to the jack holder 4 such that the mounting surface of the sub-board 6 is disposed facing the mounting surface of the main board 3. As shown in FIG. 8, a pair of screw holes 6a and 6b are disposed in the upper end portion and the lower end portion of one end portion of the sub-board 6, and a round hole 6c for positioning is disposed between the screw holes 6a and 6b.

Returning again to the description of the jack holder 4, as shown in FIG. 3, the contact portion 41c on the lower portion of the base portion 41 of the jack holder 4 is disposed so as to extend longer than the contact portion 41c on the upper portion of the base portion 41. The space that arises on the rear side of this contact portion 41c just coincides with the aforementioned space that arises on the rear side of the lower left corner of the mounting surface of the main board 3. Below, the structure of a holding portion formed in the jack holder 4 in order to dispose the power switch 5 in an economized space effectively utilizing this space will be described in detail.

Figure 4:
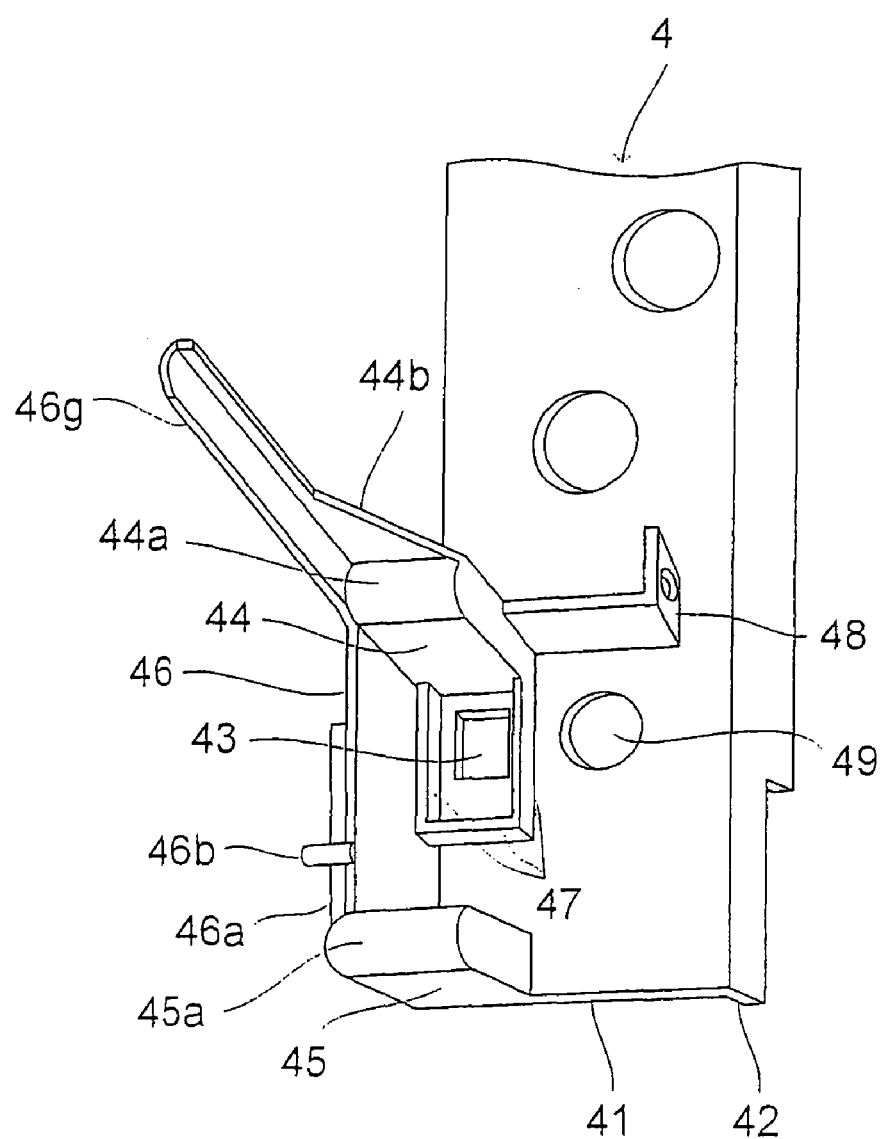
FIG. 4 is a perspective view where the lower portion of the same jack holder is seen from its back side.
Figure 5:
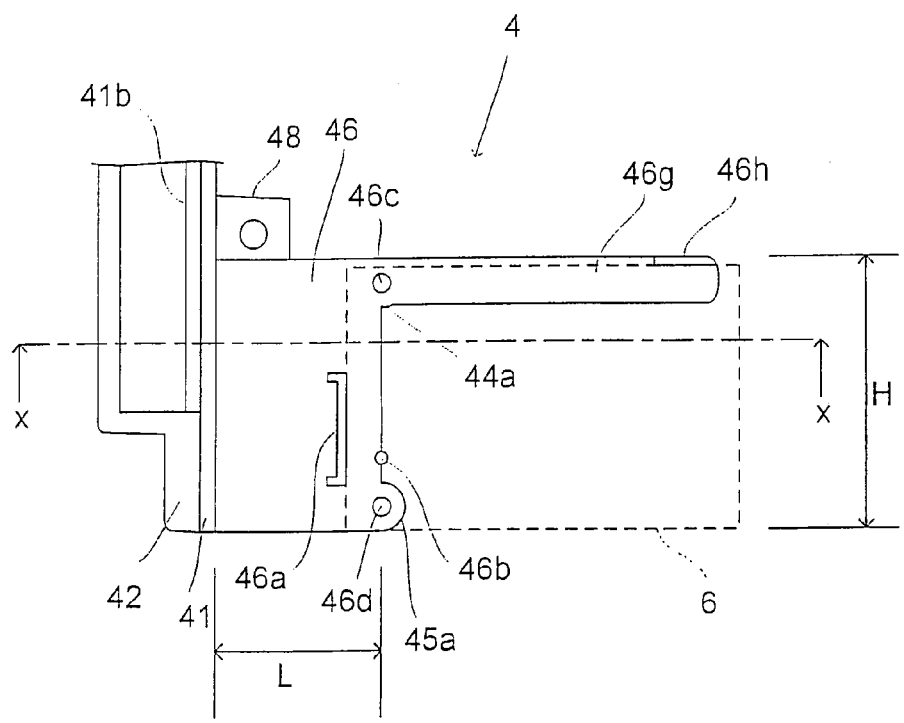
FIG. 5 is a side view of the same lower portion of the jack holder.
Figure 6:
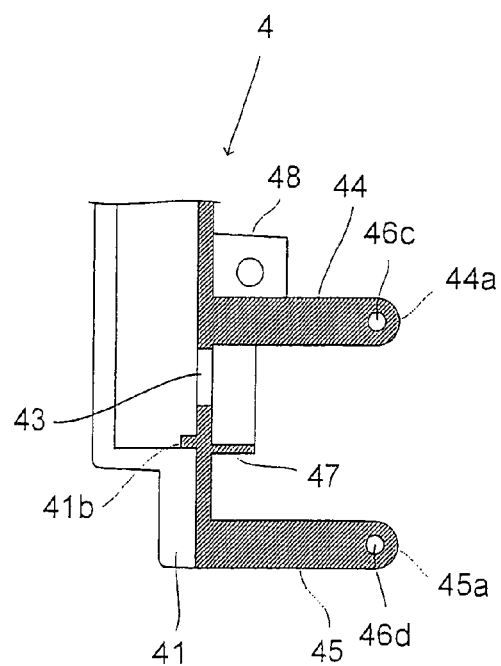
FIG. 6 is a side sectional view of the same lower portion of the jack holder.
Figure 7:
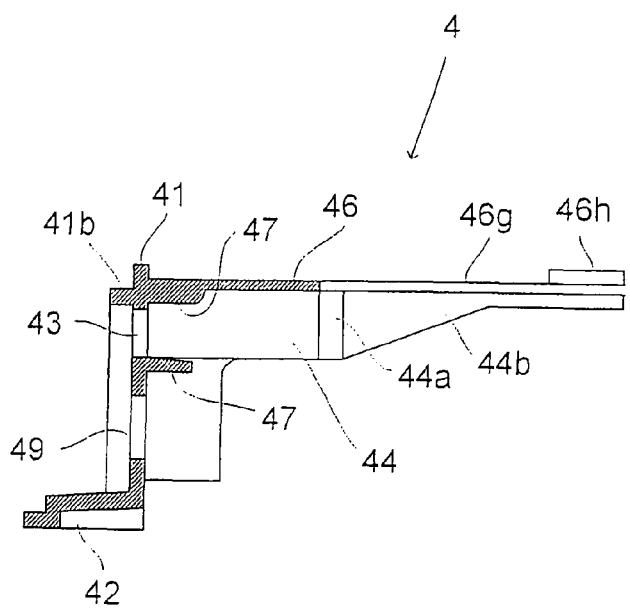
FIG. 7 is a sectional view seen along line x-x of FIG. 5.

FIG. 4 is a perspective view where the lower portion of the jack holder 4 is seen from its rear side, FIG. 5 is a side view of the same lower portion of the jack holder 4, FIG. 6 is a side sectional view of the same lower portion of the jack holder 4, and FIG. 7 is a cross-sectional view seen along line x-x of FIG. 5.

As shown in FIG. 4, a pair of reinforcement walls 44 and 45 that are disposed upright with a predetermined interval therebetween vertically and so as to sandwich the square hole 43 are formed integrally on the rear side of the base portion 41 of the jack holder 4. The rear sides of the reinforcement walls 44 and 45 are integrally coupled to the front side surface of an attachment wall 46 that is formed integrally as a vertical wall that projects at a right angle from the rear side of the base portion 41 of the jack holder 4. Thus, the reinforcement walls 44 and 45 reinforce the attachment wall 46 from its front side. Bosses 44a and 45a are formed on the distal end portions of the reinforcement walls 44 and 45.

As shown in FIG. 5, the rear side surface of the attachment wall 46 serves as an attachment surface for attaching the sub-board 6. A substantially U-shaped abutment-use convex portion 46a and a circular cylinder-shaped fitting-use convex portion 46b are formed integrally on this attachment surface in order to position the sub-board 6. Further, a pair of screw holes 46c and 46d are formed in the upper end portion and the lower end portion of the attachment wall 46 in positions that are the same distance from the base portion 41. The screw holes 46c and 46d respectively penetrate the center portions of the bosses 44a and 45a.

As shown in FIG. 5, a height direction dimension H of the attachment wall 46 is substantially equal to the width length of the sub-board 6, but a length direction dimension L of the attachment wall 46 is shorter than the length of the sub-board 6. The reason for this is because it is necessary to ensure an escape space for the switch body 51 and a power cord on the front side of the attachment wall 46 in order to attach the sub-board 6 to the attachment wall 46 such that the mounting surface of the sub-board 6 on which the switch body 51 and the power cord are mounted is disposed facing the mounting surface of the main board 3. However, that the length of the attachment wall 46 is not sufficient means that the overlapping portion where the sub-board 6 overlaps the attachment wall 46 in the length direction of the sub-board 6 cannot be sufficiently ensured, and there is the potential for the attachment strength of the sub-board 6 to be insufficient.

Thus, as shown in FIG. 5 and FIG. 7, a support portion 46g is formed so as to extend the upper end portion of the attachment wall 46 in its length direction and compensate for the insufficiency in the attachment strength of the sub-board 6. A linear abutment-use convex portion 46h for positioning the sub-board 6 is formed along the upper edge of the distal end portion of the support portion 46g.

Because the support portion 46g is a rod-like piece whose thickness is small, its mechanical strength tends to be insufficient. For this reason, as shown in FIG. 4, a thin reinforcement piece 44b whose thickness is small and which is formed so as to extend part of the reinforcement wall 44 is disposed on the front side (the side opposite from the attachment surface) of the support portion 46g along the upper edge of the support portion 46g to thereby reinforce the support portion 46g.

As shown in FIG. 4 and FIG. 6, a guide wall 47 is integrally disposed upright on the rear side of the base portion 41 of the jack holder 4 so as to surround the square hole 43 on three sides. The length dimension of the guide wall 47 is slightly longer than the stroke of the shaft 52, and the inner diameter dimension of the guide wall 47 is set to be substantially equal to the outer diameter dimension of the base portion 71 of the push button 7 shown in FIG. 8.

A holding portion of the power switch 5 is configured by the special structure (the attachment wall 46, the support portion 46g, the reinforcement walls 44 and 45, the reinforcement piece 44b, and the guide wall 47) formed on the rear side of the jack holder 4 described above.

Next, the process of attaching the power switch 5 to the holding portion of the jack holder 4 will be described. As shown in FIG. 5, one end edge of the sub-board 6 is made to abut against the abutment-use convex portion 46a on the attachment surface of the attachment wall 46 in an orientation where the power switch 5 mounted on the sub-board 6 faces the mounting surface of the main board 3, then the upper edge portion of the other end of the sub-board 6 is made to abut against the abutment-use convex portion 46h on the support portion 46g of the attachment wall 46, and then the fitting-use convex portion 46b on the attachment wall 46 is fitted together with the round hole 6c (see FIG. 8) in the sub-board 6 to thereby position the sub-board 6. Then, as shown in FIG. 1, the sub-board 6 is fixed by fastening it together with the protective plate 8 to the screw holes 46c and 46d with screws.

At this time, as shown in FIG. 2, the base portion 71 of the push button 7 attached to the shaft 52 is inserted inside the guide wall 47 so that the operation portion 72 of the push button 7 is allowed to project from the square hole 43 to the outside of the jack holder 4. Thus, by pushing the operation portion 72 from the outside of the jack holder 4, the shaft 52 advances and retracts so that it becomes possible to switch the power switch 5 ON and OFF. Further, the base portion 71 of the push button 7 is slid within the range of the stroke of the shaft 52 using the wall surfaces of the guide wall 47 and the reinforcement wall 44 as a guide, so even if the direction of the force acting on the push button 7 as a result of pushing the operation portion 72 is not parallel to the axial line of the shaft 52, the power switch 5 can be accurately switched ON and OFF because the pushing on the operation portion 72 is reliably converted to the advancing and retreating motion of the shaft 52.

In the preceding embodiment, a case was described where the switch body was mounted on a sub-board and where the power switch was held via the sub-board in the holding portion formed in the jack holder, but the attachment wall of the holding portion may also be extended in its length direction so that the switch body is directly fixed to the front side surface of this extension portion of the attachment wall. Thus, the cost of the parts can be reduced because the sub-board becomes unnecessary.

Further, in the preceding embodiment, a case was described where the power switch was held in a holding portion formed in a jack holder that holds various kinds of jacks, such as a video input terminal, an audio input terminal, and an antenna terminal, but the holding portion is not limited to a jack holder as long as it is a plate member disposed on the side surface portion of a casing. By integrally forming the holding portion on such a plate member, it becomes possible to install the power switch at a low cost in a thin display device just by changing the necessary minimum specifications and without changing the casing.

What is claimed is:

1. A power switch attachment structure of a thin display device comprising:

a display module;

a main board that is disposed on the back of the display module such that a surface of the main board on the opposite side of a surface on which parts are mounted faces the display module;

a push type power switch that includes a switch body and a shaft disposed to the switch body such that it may freely advance from and retract into the switch body;

a push button that is attached to the shaft and pushed when switching power ON and OFF; and a plate member that is attached to one end edge of the main board and is disposed on a casing side surface portion, wherein the power switch is held in a holding portion formed integrally with the plate member such that the power switch faces a mounting surface of the main board, and an operation portion of the push button is allowed to project to the outside of the casing from an open portion disposed in the plate member, and the shaft is freely slidable in a direction substantially perpendicular to a plate surface of the plate member;

wherein the switch body is mounted on a sub-board and the sub-board is held in the holding portion such that a mounting surface of the sub-board is disposed facing the mounting surface of the main board.

2. The power switch attachment structure of the thin display device of claim 1, wherein a protective plate that protects the surface of the sub-board on the opposite side of the mounting surface of the sub-board is disposed.

3. The power switch attachment structure of the thin display device of claim 2, wherein the protective plate and the sub-board are held in the holding portion of the plate member by fastening them together with screws.

4. The power switch attachment structure of the thin display device of claim 1, wherein the plate member is a jack holder that holds various kinds of jacks such as a video input terminal, an audio input terminal, and an antenna terminal.

5. The power switch attachment structure of the thin display device of claim 1, wherein the plate member is a jack holder that holds various kinds of jacks such as a video input terminal, an audio input terminal, and an antenna terminal.

6. The power switch attachment structure of the thin display device of claim 2, wherein the plate member is a jack holder that holds various kinds of jacks such as a video input terminal, an audio input terminal, and an antenna terminal.

7. The power switch attachment structure of the thin display device of claim 3, wherein the plate member is a jack holder that holds various kinds of jacks such as a video input terminal, an audio input terminal, and an antenna terminal.

* * * * *